United States Patent [19]

Rechlicz

[11] 4,339,313

[45] Jul. 13, 1982

[54] METHOD OF OPERATING AN ELECTROLYTIC CELL

[75] Inventor: Thomas A. Rechlicz, Corpus Christi, Tex.

[73] Assignee: PPG Industries, Inc., Pittsburgh, Pa.

[21] Appl. No.: 154,707

[22] Filed: May 30, 1980

Related U.S. Application Data

[63] Continuation-in-part of Ser. No. 127,291, Mar. 5, 1980.

[51] Int. Cl.$^3$ .................. C25B 1/34; C25B 13/02; C25B 13/03
[52] U.S. Cl. .................. 204/98; 204/128; 204/129; 204/295; 204/296
[58] Field of Search .................. 204/98, 128, 129, 295, 204/296

[56] References Cited

U.S. PATENT DOCUMENTS

| | | | |
|---|---|---|---|
| B 402,929 | 2/1976 | Foster et al. | 204/295 |
| 442,204 | 12/1890 | Roberts | 204/295 |
| 3,055,811 | 9/1962 | Ruff | 204/128 |

Primary Examiner—R. L. Andrews
Attorney, Agent, or Firm—Richard M. Goldman

[57] ABSTRACT

Disclosed is a method of preparing a cathode-diaphragm assembly for an electrolytic cell, where the diaphragm is adherent, e.g., to itself and to the cathode. The cathode-diaphragm unit is prepared by first depositing a protective film on the catalytic cathode, and thereafter depositing the diaphragm material under such conditions that the diaphragm material becomes self-adhering and conforms to the cathode but is spaced from the cathode. In this way the diaphragm is subsequently removable without damage to the cathode catalyst.

22 Claims, No Drawings

METHOD OF OPERATING AN ELECTROLYTIC CELL

CROSS REFERENCE TO RELATED APPLICATION

This is a continuation in part of my commonly assigned, copending U.S. Application Ser. No. 127,291 filed Mar. 5, 1980 for METHOD OF DEPOSITING AN ASBESTOS DIAPHRAGM AND THE DIAPHRAGM PREPARED THEREBY.

DESCRIPTION OF THE INVENTION

Chlor-alkali electrolytic diaphragm cells, i.e., for the electrolysis of alkali metal chloride brines such as sodium chloride or potassium chloride, have an anode and a cathode with a diaphragm therebetween. The diaphragm which heretofore has been adherent to the cathode may be an electrolyte permeable diaphragm, or an electrolyte impermeable, ion permeable permionic membrane, also referred to herein as a diaphragm. The diaphragm may be deposited, for example, deposited fibers or a deposit of a plurality of types of fibers. Alternatively, the diaphragm may be a sheet or a film. The method herein contemplated is particularly useful with deposited fibrous diaphragms, forming a self-adhering, entangled mass heretofore adhering to the cathode.

Diaphragms, for example asbestos diaphragms, including resin reinforced asbestos diaphragms, have been applied directly to a cathode structure and adhere strongly thereto. While the adhesion of the diaphragm to the cathode provides structural strength to the diaphragm, the adhesion of the diaphragm to the cathode results in a major portion of the cathodic reaction occuring on the back surface of a cathode, i.e., the surface of the cathode facing away from the diaphragm and the anode rather than the surface of the cathode facing the diaphragm and anode. This results in a relatively high electrolyte voltage drop, the ions following an indirect path from the diaphragm, around the cathode elements, e.g., mesh, or perforate or foraminous sheet or plate, to the back surface of the cathode elements, through high resistivity electrolyte.

Moreover, the diaphragm material is adherent to the cathode. This becomes particularly disadvantageous when the cathode is a catalytic cathode having an adherent catalytic film, layer, or surface on an electroconductive substrate. For example, the catalytic surface may be dissimilar from the substrate such as an iron, cobalt, nickel, or copper substrate with a porous or high surface area film, for example, a nickel film thereon. The adhesion of the film to the substrate is frequently of limited strength and may be further weakened during cell operation by some degree of undermining due to corrosive and erosive effects. Therefore, a portion of the catalytic film is usually removed along with the diaphragm material during the renewal of the diaphragm.

It has now been found that if a protective material, e.g., a film, sheet, layer, woven material, non-woven fibrous material, screen or porous entanglement of fibers, is interposed between the cathode and the diaphragm, there is provided a cathode-diaphragm unit where the front surface of the cathode, i.e., the surface facing the diaphragm and the anode, is essentially free of adherent diaphragm material and not blocked thereby, whereby an effective cell voltage reduction of 0.05 to 0.20 volt or more may be obtained. Moreover, the diaphragm does not remove significant portions of cathodic electrocatalysts upon removal of the diaphragm. Preferably the material that is interposed between the cathode and the diaphragm prior to deposition, consolidation, and formation of the diaphragm is resistant to removal during deposition, consolidation, and formation of the diaphragm, but is substantially removable thereafter, under conditions that do not adversely affect the performance of the diaphragm.

DETAILED DESCRIPTION OF THE INVENTION

Disclosed herein is a method of preparing a cathode-diaphragm unit where the diaphragm is a self-adhering, entangled fibrous mat, conforming to the cathode, substantially non-adherent to and spaced from the cathode and removable therefrom without damage to the cathode and the cathode-diaphragm unit prepared thereby.

In this way there is provided the diaphragm that is a self-adherent, entangled mass of fibers, conforming to the cathode, substantially non-adherent thereto, and removeable therefrom without significant damage to any cathodic electrocatalyst which may be present on the surface of the cathode.

By a self-adhering entangled fibrous mat or web is meant a mat of fibers or diaphragm material which fibers adhere to one another, for example, after curing, heating, or other treatment, so as to form a cohesive structure.

By conforming to the cathode it is meant that the cathode is the same shape as the cathode, that is it is finger-shaped where the cathode is finger-shaped and is a flat plane where the cathode is a flat plane.

By a diaphragm that is substantially non-adherent to and spaced from the cathode, it is meant that the front surfaces of the individual cathode elements, e.g., individual strands of wire mesh, are wetted by or capable of being wetted by electrolyte, and not blinded by adherent diaphragm material, whereby electrolysis may take place on the front surfaces thereof. As herein contemplated, the contact between the diaphragm and the catalytic cathode material is irregular point contact, with contact free channels of 5 mils or more in diameter. This irregular point contact with contact free channels is largely due to compression and partial collapse of the diaphragm because of the pressure differential between the anolyte and catholyte chambers.

By the diaphragm being removeable from the cathode without damage to catalyst material present on the cathode surface it is meant that the catalyst material or substantial amounts thereof are not removed from the cathode substrate during diaphragm removal and renewal.

The cathode, including the cathode substrate and catalytic surface is preferably foraminous, for example, a perforated sheet, perforated plate, mesh, expanded mesh, or screen.

The cathode has an electroconductive substrate which may have a catalytic surface thereon. By an electroconductive substrate it is meant a metal substrate, for example iron, cobalt, nickel, copper, as well as admixtures and alloys thereof, or a graphite substrate. Preferably the substrate is a metal substrate. In a particularly preferred exemplification it is an iron substrate.

The substrate may be a perforated plate, a perforated sheet, or a mesh. When it is mesh it may be expanded, calendered, or flattened, i.e., rolled. The substrate preferably has an open area of 20 to 80 percent, and preferably of 35 to 65 percent. One particularly desirable cathode substrate is calendered iron mesh having from 4 to 8 mesh per inch in each direction, i.e., from 16 to 24 mesh per square inch, and from 35 to 65 percent open area. A substrate having approximately 40 percent open area, six mesh per linear, i.e., 36 openings per square inch, and fabricated 0.067 inch diameter steel is available commercially.

By a catalytic surface it is meant that the surface material has a lower hydrogen evolution overvoltage than the substrate. Preferably the catalytic surface is a high surface area material, having a surface area from about 20 square meters per gram to about 200 square meters per gram, and the surface material is resistant to the effects of caustic soda at concentrations of 8 to 55 weight percent.

One particularly desirable catalytic surface area is provided by high surface area nickel, for example, as a codeposit of nickel and a sacrificial metal with subsequent removal of the sacrificial metal. High surface area nickel coatings include codeposits of nickel and aluminum, nickel and iron, nickel and zinc, or nickel and vanadium, with subsequent removal of the aluminum, iron, zinc, or vanadium. Other catalytic surfaces may be prepared by the codeposition of a catalytic metal and a sacrificial metal, and subsequent removal of the sacrificial metal. Typical catalytic metals include iron, cobalt, nickel, molybdenum, ruthenium, rhodium, palladium, osmium, iridium, and platinum. Sacrificial metals include aluminum, iron, zinc, vanadium, chromium, and the like. The metals may be codeposited by electrodeposition, electroless deposition, flame spraying, plasma spraying, ion bombardment, coating, spraying, thermal decomposition of organometallics, or even thermal diffusion of one metal into the other, as thermal diffusion of aluminum into nickel.

Alternatively, the catalytic coating may be prepared by sintering powders of only the catalytic metal, or by sintering powders of the catalytic metal and the sacrificial metal and leaching out the sacrificial metal.

According to a further alternative, the active metal may be deposited under conditions where it forms a porous, catalytic surface.

The method of this invention is particularly useful where the cathode is activated after installation of the diaphragm. That is, the method of this invention is particularly useful where the less active, leachable material, i.e., the zinc of a deposited nickel-zinc surface, or the aluminum of a nickel-aluminum surface is removed after installation of the diaphragm on the cathode, and the installation of the diaphragm-cathode unit in the electrolytic cell.

While the reason for this is not clearly understood, it is believed that the activation or leaching process results in the growth of crystallites from the cathode surface into a tightly adhering diaphragm. It is believed that these crystallites do not grow into the diaphragm prepared by the method described herein.

The diaphragm herein contemplated rests upon and contacts the cathode, for example as a fibrous entanglement of non-woven, unoriented fibers, such as a fibrous entanglement of asbestos, most commonly chrysotile asbestos, or a fibrous entanglement of asbestos and a thermoplastic material, which thermoplastic material appears to increase the adhesion of the diaphragm both to itself and to the cathode.

The fibrous entangled diaphragms, including electrolyte permeable diaphragms and electrolyte impermeable, ion permeable diaphragms, may be formed in situ so as to conform to the cathode, and in this way the fibers are rendered even more adherent to the cathode.

Diaphragms prepared as described above have limited service lives, for example from about 3 months to about 18 months, depending upon the presence or absence of reinforcing material.

According to the invention herein contemplated a protective material, for example a protective film, is applied on the catalytic cathode between the catalytic cathode and the intended diaphragm.

The protective material is resistant to removal during deposition of the diaphragm material, e.g. the asbestos or the asbestos and resin, and during the formation of the entangled fibrous diaphragm microstructure. In this way it is possible to avoid adhesion of the diaphragm material to the cathode catalyst, without inhibiting adhesion of the diaphragm material to either itself or the protective material, whereby to provide a diaphragm with the fibers of diaphragm material adherent to each other as a substantially self-adherent mass of entangled fibers.

The diaphragm may be deposited atop the protective material and cathode by drawing fibrous diaphragm material from a slurry thereof, for example a slurry of asbestos in a solvent such as water, aqueous brine, aqueous caustic soda or aqueous sodium hydroxide-sodium chloride cell liquor, or from a slurry of asbestos or asbestos and thermoplastic resin in a solvent such as an organic solvent, e.g. alcohol, or an inorganic solvent such as water, aqueous brine, aqueous sodium hydroxide or aqueous sodium hydroxide-sodium chloride cell liquor.

The cathodic protective material may be applied to the cathode as a liquid or paste, for example, a wax, lacquer, or latex. When so applied the solute or solid is preferably an organic material sparingly soluble in aqueous alkali cell liquor at the temperatures at which the diaphragm is formed. By a sparingly soluble organic material is meant an organic material that, when applied to tne cathode, requires at least about 4 hours, and preferably at least about 24 hours to be solubilized or destroyed by concentrated solutions of sodium hydroxide. That is, the sparingly soluble organic material remains on the cathode as a coating or film for the time required to deposit, dry and cure the diaphragm materials, but is destroyed or solubilized shortly thereafter whereby to expose the cathode catalyst to the catholyte liquor. Preferably the film of the sparingly soluble material is from about 0.1 to about 10 mils thick, although thicker or thinner films may be employed, it being recognized that the film is non-uniform.

Alternatively, the protective material may be an overlay of a fibrous, perforate, foraminous, woven, or non-woven material. The material may be polymeric, and either synthetic or naturally occurring. When a fibrous material is used it should be thick enough to prevent direct contact of diaphragm material with the cathode, i.e., the porous cathode catalyst, during diaphragm material deposition and formation, but thin enough to deteriorate thereafter, i.e., after formation of the self adhering, conforming diaphragm. In this way the fibers do not penetrate beyond the front plane of the cathode.

Preferably the overlay is resistant to the slurry that carries the fibrous asbestos material for a time sufficient to allow deposition of the fibrous material and formation of the diaphragm, but is subject to attack by cell liquor over a period of time short enough to allow cell operation substantially free of the cathode protective material, i.e. several minutes to several hours.

The overlay may be provided by inorganic material such as glass fibers, by a foraminous metal such as an aluminum screen, or by naturally occurring polymers such as starch, cellulose, cotton, or by treated polymers such as rayon, or synthetic polymers such as polyolefins, e.g. polyethylene, polybutylene, polyproplene, or by polyesters such as polycarbonates and nylon, or by inorganic polymers such as fiberglass or aluminum. When aluminum is used, it is leached out by caustic soda.

Especially preferred are naturally occurring polymers such as cotton, and treated naturally occurring polymers such as rayon.

The overlay should be such as to have some porosity, e.g., from about 10 percent open area to about 90 percent open area, a thickness of about 1 to about 100 mils, and preferably from about 2 to about 20 mils. In this way the separation of the diaphragm and cathode is minimized.

The cathode-diaphragm unit prepared according to the method of this invention has the diaphragm macroscopically uniformly spaced therefrom, but microscopically non-uniformly spaced therefrom with areas of point contact and adhesion, and open areas. The open areas between the diaphragm and the cathode on the front surface of the cathode, i.e., the surface of the cathode facing the diaphragm and anode, allow a major portion of the cathode reaction to take place on the front surface thereof. In this way a cell voltage reduction of 0.05 to 0.20 volt may be obtained.

According to one exemplification of the method herein contemplated a resin reinforced asbestos diaphragm may be deposited atop a non-woven rayon fiber mat on a catalytic cathode. The catalytic cathode may be an expanded iron mesh substrate having a porous nickel surface, as prepared by the co-electrodeposition of nickel and zinc and the leaching of the zinc. Placed on the surface of the cathode and conforming thereto is a thin sheet, for example a 5 mil thick sheet, of rayon, having a weight of from about 10 to about 30 grams per square yard. Thereafter, an entangled fibrous mat may be deposited on the cathode by drawing a slurry of chrysotile asbestos and polymer through the cathode and the rayon sheet whereby to deposit the chrysotile asbestos and the polymer on the rayon sheet. The cathode and diaphragm unit may then be heated, for example to about 250° to 300° C., causing the polymer to melt and to adhere the asbestos fibers to each other. In the case of certain polymers, e.g., rayon, the intervening sheet is charred and burned. Thereafter, when other materials are used to provide the intervening mat, the mat is destroyed by exposure to catholyte cell liquor for a period of several hours.

According to an alternative exemplification, the overlay is a slurry deposited, mat of non-woven, unoriented particles of a sacrificial material resting upon the cathode and carrying the diaphragm atop it. For example, the cathode may be first inserted in a slurry of fibrous or particulate material that is resistant to removal during deposition of the diaphragm material and formation of the entangled, fibrous diaphragm microstructure, but is removable thereafter. The diaphragm material is then deposited atop the first deposited mat, i.e., atop the mat of sacrificial materials.

According to this exemplification, a slurry of sacrificial material, e.g., a slurry consisting of cellulose fines and water, or a slurry consisting of rayon fines or fibers or particles and water, is drawn through a cathode to slurry deposit a mat of non-woven, unoriented, particles of sacrificial material. Thereafter, the cathode is removed from the slurry of sacrificial material and inserted in a slurry of diaphragm material, and the diaphragm material slurry is drawn through the sacrificial material slurry and the cathode, whereby to deposit the diaphragm material atop the sacrificial material.

Thereafter the sacrificial material may be destroyed, e.g., by contact with the cell liquor or by burning or charring. This provides a diaphragm of deposited, non-woven, non-oriented, fibrous materials, spaced from and conforming to the cathode.

The sacrificial materials depositable by slurry deposition are those materials that are of the proper surface tension, density, and geometry to be held in suspension. Exemplary fibrous materials include fiber glass, aluminum fibers, starch, cellulose, cotton, rayon, polyolefines, polycarbonates, and nylon. Especially preferred are naturally occurring polymers such as starch, cotton and cellulose, treated polymers such as rayon, and readily dissolvable synthetic polymers such as nylon.

The particles, including fibers, of the sacrificial material are small enough to be held in suspension, but large enough to deposit upon the porous cathode, and build up a filter cake or mat thereon.

The solvent used to carry the particles of sacrificial material may be water, water with a surfactant, water with a density or viscosity enhancing solute, or an organic solvent as an alcohol, a glycol, or the like.

The diaphragm of this invention, prepared according to the method of this invention, is a self-adherent, entangled fibrous mass of non-woven, unoriented fibers, conforming to, spaced from, non-adherent to, and removable from the cathode. The diaphragm material is typically chrysotile asbestos, and may contain a reinforcing or stabilizing amount of a thermoplastic resin. In this way, electrolysis takes place on the surface of the cathode facing the anode and diaphragm, with hydrogen being evolved on the surface of the cathode facing the diaphragm and anode, and hydrogen being collected between the cathode and the diaphragm.

The iron mesh substrate had 36 openings per inch, approximately 40 percent open area, and was fabricated of 0.067 inch diameter iron mesh.

After electrolysis has been carried out for a long enough time for the diaphragm to display signs of wear, e.g. from about 3 months to about 18 months, the cell can be taken out of service and the diaphragm removed therefrom, for example with mechanical stripping or low pressure water, with substantially little if any damage to the catalytic cathode. A new catalytic cathode coating need not be deposited atop the cathode substrate prior to depositing a new diaphragm, also with the intervening mat herein described.

The following examples illustrated how the present invention may be practiced:

EXAMPLE I

A resin-reinforced asbestos diaphragm was deposited atop a non-woven rayon fabric mat on a catalytic cathode.

The cathode was prepared by co-electrodepositing nickel and zinc onto an expanded iron mesh substrate, and thereafter leaching out the zinc in aqueous caustic soda. The iron mesh substrate had 36 openings per inch, approximately 40 percent open area, and was fabricated of 0.067 inch diameter iron mesh.

A 5 mil thick sheet of Kendall Webril ® rayon, non-woven fabric, having a weight of 17.5 grams/square yard was put on the cathode.

An entangled fiber mat containing about 10 weight percent Allied Chemical Co. HALAR ® poly(ethylene-chlortrifluoroethylene) powder, balance chrysotile asbestos fibers was prepared by drawing a sodium chloride-sodium hydroxide slurry containing 1.8 weight percent solids through the cathode and rayon sheet, which was atop a filtering funnel. The assembly of wet, asbestos and resin entangled fibers atop the rayon and cathode were removed from the filter and heated at 100° C. for 24 hours.

The cathode, with the intermediate rayon sheet, and the resin reinforced asbestos mat, was then heated to 265° C. for one hour to provide a self-adhering resin reinforced, fibrous asbestos diaphragm on a catalytic cathode.

The cathode was tested in a laboratory overvoltage cell containing a ten weight percent NaOH, fifteen weight percent NaCl electrolyte at 90° C. The electrode had a cathode potential of 1.12 volts at a current density of 190 amperes per square foot.

After removal of the diaphragm there was no increase in cathode voltage.

EXAMPLE II

A resin reinforced asbestos diaphragm was deposited on a non-woven rayon fabric mat atop a catalytic cathode.

The cathode was prepared by co-electrodepositing nickel and zinc onto an iron mesh substrate as described in Example I, above, and thereafter leaching out the zinc in aqueous caustic soda.

A slurry was prepared containing polyvinyl alcohol and acetone. A 5 mil thick Kendall WEBRIL ® rayon, non-woven fabric sheet was placed in the slurry and wetted. The wetted rayon sheet was placed on the catalytic cathode.

Thereafter an entangled fiber mat containing about 10 weight percent Allied Chemical Co. HALAR ® poly-lethylene-chlorotrifluoroethylene) powder, balance chrysotile asbestos fibers, was prepared by drawing a sodium chloride-sodium hydroxide slurry containing 1.8 weight percent solids through the rayon sheet and cathode to a filtering funnel. The assembly of the wet asbestos and resin entangled fibers, rayon sheet, and cathode was removed from the filter and heated at 100° C. for 24 hours. The cathode, with the intermediate rayon sheet and the resin reinforced asbestos mat, was then heated to 265° C. for one hour to provide a self-adhering, resin reinforced, fibrous asbestos diaphragm atop the catalytic cathode.

The cathode was tested in a laboratory electrolytic cell as described in Example I, and had a cathode potential of 1.12 volts at a current density of 190 amperes per square foot.

After removal of the diaphragm there was no increase in cathode voltage.

EXAMPLE III

A resin-reinforced asbestos diaphragm was deposited atop a slurry deposited cellulose mat on a catalytic cathode.

The cathode was a 5 inch by 7 inch mild steel mesh substrate having 36 openings per square inch, approximately 40 percent open area, and fabricated of 0.067 inch diameter steel mesh. The catalytic surface was deposited by electrodeposition of nickel and zinc, and then leached in caustic soda.

A cellulose slurry was prepared by adding of glassine paper in an aqueous solution of 10 weight percent NaOH and 15 weight percent NaCl to provide a 0.15 weight percent slurry. The solution was allowed to sit for one week, washed with water, and dried in air. The glassine was then placed in water to provide a 0.5 weight percent slurry. This slurry was drawn through the cathode to deposit a cellulose mat.

Thereafter a slurry containing 1.8 weight percent chrysotile asbestos and 0.2 weight percent Allied Chemical Company HALAR ® poly(ethylene-chlorotrifluoro ethylene) was drawn through the cathode and the slurry deposited cellulose mat to deposit 0.34 pounds per square foot of asbestos atop the cellulose mat.

The cathode unit was heated to 100° Centigrade for one hour, and then to 265° Centigrade for one hour. The cathode unit was then installed in a labortory diaphragm cell, and spaced 0.25 inches from a $RiO_2$-$TiO_2$ coated titanium mesh anode.

After 25 days of electrolysis at 190 Amperes per square foot, the cell voltage was 2.89 volts, the diaphragm IR drop was 0.58 volt, the anode current efficiency was 93.08 percent, the cathode current efficiency was 94.58 percent, and product was produced at 2092 kilowatt hours per ton.

Although the invention has been described in terms of specific details, exemplification, and embodiments, the description is not intended to limit the invention, the scope of which is defined in the following claims.

I claim:

1. In a method of operating an electrolytic cell having an anolyte compartment with an anode therein, a catholyte compartment with a cathode therein, the anolyte compartment being separated from the catholyte compartment by an asbestos diaphragm, which method comprises feeding alkali metal chloride brine to the anolyte compartment, imposing an electrical potential across the cell, and evolving chlorine at the anode and hydrogen at the cathode, the improvement wherein the diaphragm is slurry deposited, comprised of a self-adherent, entangled mass of nonwoven unoriented fibers, and substantially spaced from the cathode, said diaphragm and cathode having irregular contact with channels therebetween, whereby the diaphragm facing surfaces of the cathode are substantially contacted by electrolyte, and wherein the hydrogen is collected between the diaphragm and the cathode.

2. The method of claim 1 comprising evolving hydrogen on the surface of the cathode facing the diaphragm and the anode.

3. The method of claim 2 wherein the diaphragm is prepared by first depositing a sacrificial material on the cathode, which sacrificial material is substantially resistant to removal during diaphragm deposition and substantially removable thereafter to expose the cathode while maintaining the diaphragm intact, and thereafter depositing the diaphragm and forming a non-woven, unoriented, fibrous entanglement of diaphragm material, and thereafter removing the sacrificial material whereby to leave a diaphragm that is self adherent, conforming to and spaced from the cathode, and removable from the cathode.

4. The method of claim 3 wherein the sacrificial material is deposited from a slurry onto the cathode.

5. The method of claim 4 wherein the material deposited atop the cathode between said cathode and the diaphragm is a fibrous polymeric material.

6. The method of claim 5 wherein the fibrous polymeric material is chosen from the group consisting of cellulosics, polyolefins, and polyesters.

7. The method of claim 6 wherein the fibrous polymeric material is rayon.

8. The method of claim 5 wherein the polymer fibers are deposited atop the cathode, and the diaphragm is thereafter deposited atop the deposited polymer fibers.

9. The method of claim 3 wherein the material deposited atop the cathode between the cathode and the diaphragm is applied thereto in a liquid.

10. The method of claim 9 wherein the liquid is chosen from the group consisting of latexes and lacquers comprising a solute and a solvent.

11. The method of claim 10 wherein the solute is chosen from the group consisting of cellulosics and polyesters.

12. The method of claim 3 wherein the cathode comprises an electroconductive substrate with an adherent catalytic coating thereon, and wherein the cathode was prepared by depositing an electrocatalytic coating thereon.

13. In a method of operating an electrolytic cell having an anolyte compartment with an anode therein, a catholyte compartment with a cathode therein, the anolyte compartment being separated from the catholyte compartment by an asbestos diaphragm, which method comprises feeding alkali metal chloride brine to the anolyte compartment, imposing an electrical potential across the cell, and evolving chlorine at the anode and hydrogen at the cathode, the improvement wherein the diaphragm is slurry deposited, comprised of a self-adherent, entangled mass of non-woven unoriented fibers substantially spaced from the cathode, said diaphragm and cathode having irregular contact with channels therebetween whereby the diaphragm facing surfaces of the cathode are contacted by electrolyte, said diaphragm being prepared by first depositing a sacrificial material on the cathode, which sacrificial material is substantially resistant to removal during diaphragm deposition and substantially removable thereafter to expose the cathode while maintaining the diaphragm intact, subsequently depositing fibrous diaphragm material and forming a non-woven, unoriented, fibrous entanglement of diaphragm material, and thereafter removing the sacrificial material whereby to leave a diaphragm that is substantially self-adherent, conforming to, spaced from, and removable from the cathode.

14. The method of claim 13 wherein the sacrificial material is deposited from a slurry onto the cathode.

15. The method of claim 14 wherein the sacrificial material deposited atop the cathode between said cathode and the diaphragm is a fibrous polymeric material.

16. The method of claim 15 wherein the fibrous polymeric material is chosen from the group consisting of cellulosics, polyolefins, and polyesters.

17. The method of claim 16 wherein the fibrous polymeric material is rayon.

18. The method of claim 15 wherein the polymer fibers are deposited atop the cathode, and the diaphragm is thereafter deposited atop the deposited polymer fibers.

19. The method of claim 13 wherein the sacrificial material deposited atop the cathode between the cathode and the diaphragm is applied thereto in a liquid.

20. The method of claim 19 wherein the liquid is chosen from the group consisting of latexes and lacquers comprising a solute and a solvent.

21. The method of claim 20 wherein the solute is chosen from the group consisting of cellulosics and polyesters.

22. The method of claim 13 wherein the cathode comprises an electroconductive substrate with an adherent electrocatalytic coating thereon, and wherein the cathode was prepared by depositing the electrocatalytic coating thereon.

* * * * *